United States Patent
Fukuyo et al.

(10) Patent No.: US 11,872,527 B2
(45) Date of Patent: Jan. 16, 2024

(54) HONEYCOMB FILTER

(71) Applicant: NGK Insulators, Ltd., Nagoya (JP)

(72) Inventors: Koji Fukuyo, Nagoya (JP); Michio Suzuki, Nagoya (JP); Yasutaka Watanabe, Kasugai (JP); Ken Itadu, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 522 days.

(21) Appl. No.: 17/166,414

(22) Filed: Feb. 3, 2021

(65) Prior Publication Data
US 2021/0299610 A1    Sep. 30, 2021

(30) Foreign Application Priority Data

Mar. 31, 2020   (JP) ................. 2020-062588

(51) Int. Cl.
*B01D 53/88*   (2006.01)
*B01J 35/04*   (2006.01)
*C04B 38/00*   (2006.01)

(52) U.S. Cl.
CPC ............ *B01D 53/885* (2013.01); *B01J 35/04* (2013.01); *C04B 38/0009* (2013.01); *B01D 2255/915* (2013.01); *B01D 2255/92* (2013.01)

(58) Field of Classification Search
CPC ...... B01D 39/06; B01D 55/523; B01D 53/88; B01J 35/04; F01N 3/00; F01N 3/022; F01N 3/0222
See application file for complete search history.

(56) References Cited

U.S. PATENT DOCUMENTS

| 2005/0011186 A1 | 1/2005 | Saito et al. |
| 2005/0120691 A1* | 6/2005 | Miwa ............... F01N 3/035 55/523 |

(Continued)

FOREIGN PATENT DOCUMENTS

| JP | 2005-002972 A | 1/2005 |
| JP | 2010-115634 A1 | 5/2010 |
| WO | 2008/078799 A1 | 7/2008 |

OTHER PUBLICATIONS

Japanese Office Action (Application No. 2020-062588) dated Aug. 15, 2023 (with English translation) (6 pages).

(Continued)

*Primary Examiner* — Sharon Pregler
(74) *Attorney, Agent, or Firm* — BURR PATENT LAW, PLLC

(57) ABSTRACT

A honeycomb filter including: a pillar-shaped honeycomb structure having an inflow end face and an outflow end face and including a porous partition wall disposed so as to surround a plurality of cells, the plurality of cells extending from the inflow end face to the outflow end face; inflow side plugging portions disposed at open ends of predetermined cells on the inflow end face side; and outflow side plugging portions disposed at open ends of residual cells on the outflow end face side, wherein the outflow side plugging portions comprise first outflow side plugging portions and second outflow side plugging portions, the plugging length L1 of the first outflow side plugging portions is 10 to 50% of the overall length L0 of the honeycomb structure, and the plugging length L2 of the second outflow side plugging portions is less than 10% of the overall length L0 of the honeycomb structure.

8 Claims, 12 Drawing Sheets

(56) References Cited

U.S. PATENT DOCUMENTS

2009/0274867 A1    11/2009  Hiramatsu
2010/0093528 A1     4/2010  Furuta et al.
2016/0241549 A1*    8/2016  Labaton .............. H04L 63/0428

OTHER PUBLICATIONS

Chinese Office Action dated Apr. 29, 2022 (Application No. 202110167608.3).

* cited by examiner

HONEYCOMB FILTER

The present application is an application based on JP2020-062588 filed on 31 Mar. 2020 with Japan Patent Office, the entire contents of which are incorporated herein by reference.

BACKGROUND OF THE INVENTION

Field of the Invention

The present invention relates to honeycomb filters. Specifically, the present invention relates to a honeycomb filter capable of having a lower maximum temperature during combustion in the regeneration process of the filter to burn and remove particulate matters trapped and removed at the partition wall, and enabling a small temperature distribution in the filter.

Description of the Related Art

Exhaust gas emitted from internal combustion engines, such as a diesel engine and a gasoline engine, contains particulate matters and nitrogen oxides. These particulate matters and nitrogen oxides are harmful to humans and environment, and so the emission is restricted. To this end, the through channel to emit the exhaust gas comes with a filter to trap the particulate matters and a catalyst to purify the nitrogen oxides. A honeycomb filter having a honeycomb structure has been known as a filter to trap the particulate matters (see Patent Literatures 1 and 2, for example). Hereinafter the particulate matter in exhaust gas may be called "PM". "PM" stands for "particulate matter".

A honeycomb structure includes a partition wall made of porous ceramics, such as cordierite, and this partition wall defines a plurality of cells. A honeycomb filter comes with a plugging portion disposed at this honeycomb structure so as to plug the open ends of the plurality of cells at the inflow end face side and the outflow end face side alternately. In other words, a honeycomb filter has inflow cells that are open at the inflow end face side and are plugged at the outflow end face side and outflow cells that are plugged at the inflow end face side and are open at the outflow end face side, and these inflow cells and outflow cells are disposed alternately via the partition wall. In this honeycomb filter, the porous partition wall serves as a filter to trap the PM in exhaust gas.

To enhance the mountability on a vehicle and the purifying performance of nitrogen oxides, techniques of loading the above-described honeycomb filter with a catalyst to purify nitrogen oxides have been proposed.

[Patent Document 1] WO 2008/078799
[Patent Document 2] JP-A-2010-115634

SUMMARY OF THE INVENTION

Continuous removal of PMs in exhaust gas with a honeycomb filter causes the accumulation of the PMs inside the honeycomb filter, and so increases the pressure loss of the honeycomb filter. Then, a purifying device including such a honeycomb filter is configured to burn the accumulated PM inside the honeycomb filter automatically or manually to avoid an excessive pressure loss of the honeycomb filter. Hereinafter, the operation to burn the PM accumulated inside a honeycomb filter may be called "regeneration operation" of the honeycomb filter.

Such regeneration operation of a honeycomb filter forcibly burns the PM accumulated inside the honeycomb filter, so that the temperature inside the honeycomb filter rises. This means that heat generated from the burning may accelerate the deterioration of the nitrogen-oxide purifying catalyst loaded at the honeycomb filter. Such a honeycomb filter loaded with a nitrogen-oxide purifying catalyst therefore requires maintenance such as periodic replacement in consideration of deterioration of the catalyst. To achieve the intended purifying performance, the honeycomb filter has to be loaded with more catalyst in advance because the deterioration of the catalyst is expected, and this increases the manufacturing cost of the honeycomb filter.

In view of such problems of the conventional techniques, the present invention provides a honeycomb filter capable of having a lower maximum temperature during combustion in the regeneration process of the filter to burn and remove particulate matters trapped and removed at the partition wall, and enabling a small temperature distribution in the filter.

The present invention provides the following honeycomb filter.

[1] A honeycomb filter comprising: a pillar-shaped honeycomb structure having an inflow end face and an outflow end face and comprising a porous partition wall disposed so as to surround a plurality of cells, the plurality of cells extending from the inflow end face to the outflow end face and serving as a through channel of fluid;
   inflow side plugging portions disposed at open ends of predetermined cells of the plurality of cells on the inflow end face side; and
   outflow side plugging portions disposed at open ends of residual cells other than the predetermined cells of the plurality of cells on the outflow end face side,
   wherein
   the outflow side plugging portions comprise first outflow side plugging portions and second outflow side plugging portions,
   let that a length of the honeycomb structure from the inflow end face to the outflow end face is an overall length L0,
   a length of the first outflow side plugging portions from the outflow end face is a plugging length L1, and
   a length of the second outflow side plugging portions from the outflow end face is a plugging length L2,
   the plugging length L1 of the first outflow side plugging portions is 10 to 50% of the overall length L0 of the honeycomb structure, and
   the plugging length L2 of the second outflow side plugging portions is less than 10% of the overall length L0 of the honeycomb structure.

[2] The honeycomb filter according to [1], wherein the number of the first outflow side plugging portions is 10 to 50% of a total number of the outflow side plugging portions.

[3] The honeycomb filter according to [1] or [2], wherein the honeycomb structure has a length L0 of 100 to 350 mm.

[4] The honeycomb filter according to any one of [1] to [3], wherein let that, on the outflow end face side of the honeycomb structure, a direction of arranging the plurality of cells in one direction is a first direction and a direction orthogonal to the first direction is a second direction, adjacent cells along the first direction and adjacent cells along the second direction are each plugged alternately with one of the inflow side plugging portions and one of the outflow side plugging portions, and
   of the outflow side plugging portions along the first direction or the second direction, the first outflow side plugging portions and the second outflow side plugging portions are placed so as to be adjacent in any one of the first direction and the second direction.

[5] The honeycomb filter according to any one of [1] to [4], wherein let that, on the outflow end face side of the honeycomb structure, a direction of arranging the plurality of cells in one direction is a first direction and a direction orthogonal to the first direction is a second direction, adjacent cells along the first direction and adjacent cells along the second direction are each plugged alternately with one of the inflow side plugging portions and one of the outflow side plugging portions, and of the outflow side plugging portions along the first direction or the second direction, the number of the first outflow side plugging portions placed continuously is 4 or less.

[6] The honeycomb filter according to any one of [1] to [5], wherein the partition wall has porosity of 30 to 70%.

[7] The honeycomb filter according to any one of [1] to [6], wherein let that a length of the inflow side plugging portions from the inflow end face is a plugging length L3,
the plugging length L3 of the inflow side plugging portions is less than 10% of the overall length L0 of the honeycomb structure.

The honeycomb filter of the present invention is capable of having a lower maximum temperature during combustion in the filter regeneration process to burn and remove the PM trapped and removed at the partition wall, and enabling a small temperature distribution in the filter. Specifically, the honeycomb filter of the present invention is configured so that the outflow side plugging portions disposed at the open ends of the cells on the outflow end face side include the first outflow side plugging portions having a relatively long plugging length and the second outflow side plugging portions having a relatively short plugging length. This configuration disperses the distribution of the PM trapped inside the honeycomb filter, and so enables a lower maximum temperature during combustion of the PM and a small temperature distribution inside the filter. The first outflow side plugging portions having a relatively long plugging length increases the heat capacity at the outflow end face side, and so enhances the above-described effect more.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

Figure 1:
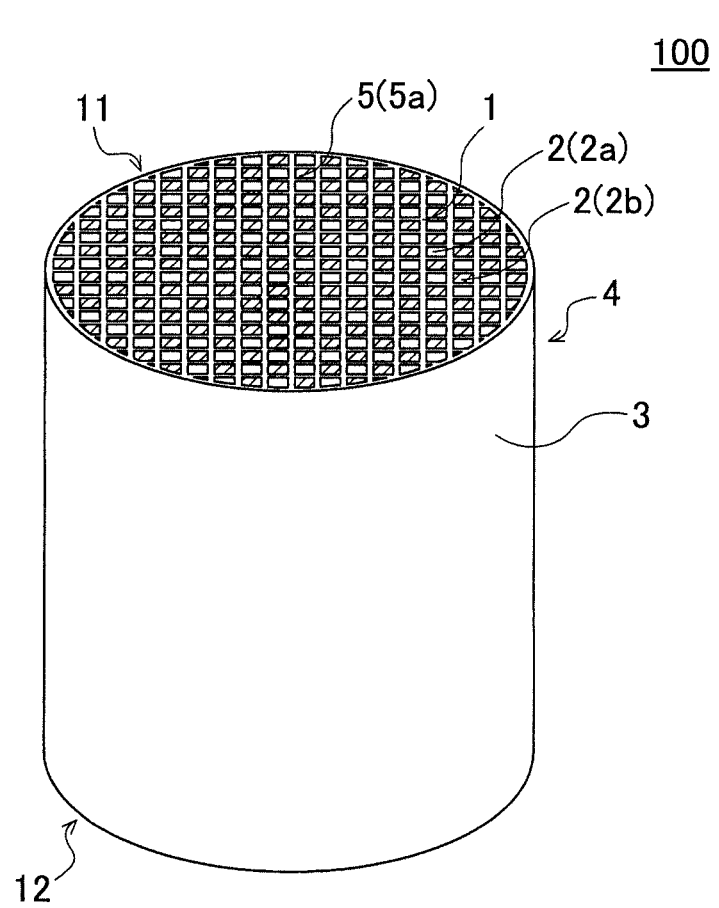
FIG. 1 is a perspective view schematically showing a first embodiment of a honeycomb filter of the present invention viewed from the inflow end face side.
Figure 2:
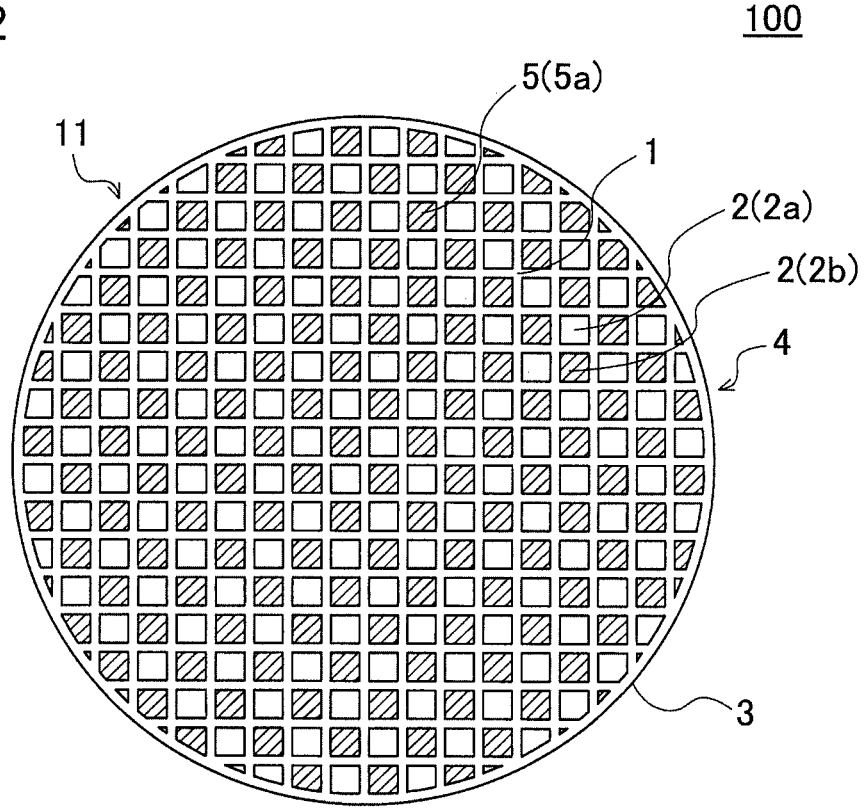
FIG. 2 is a plan view of the honeycomb filter of FIG. 1 viewed from the inflow end face side.
Figure 3:
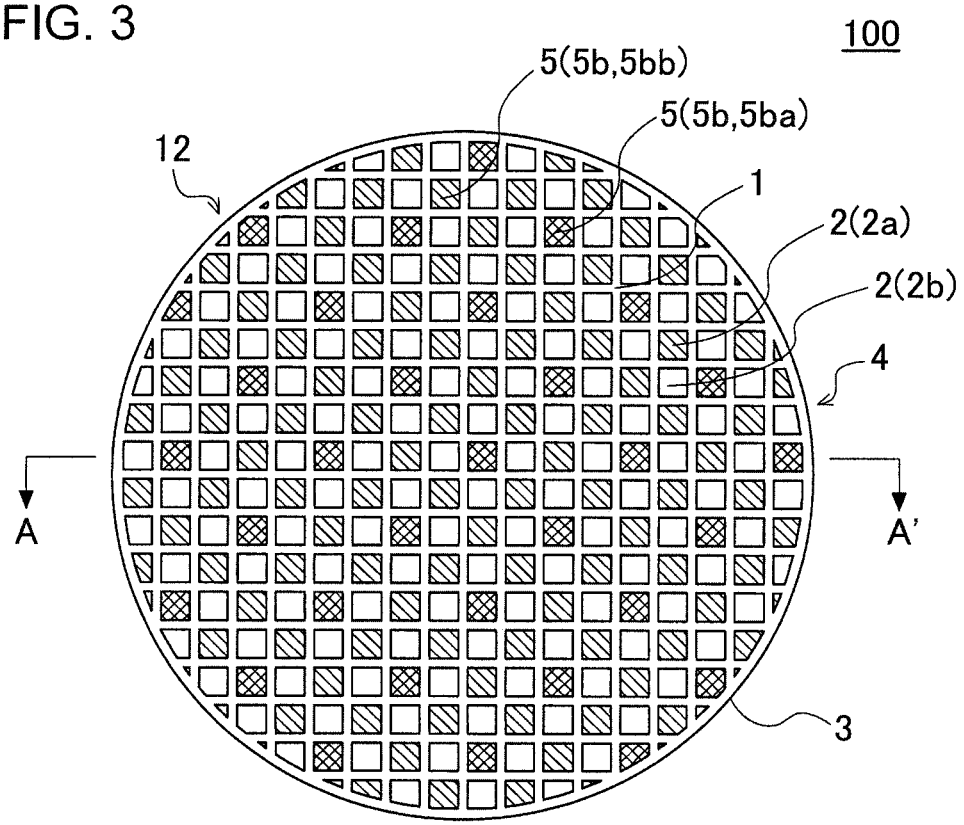
FIG. 3 is a plan view of the honeycomb filter of FIG. 1 viewed from the outflow end face side.
Figure 4:
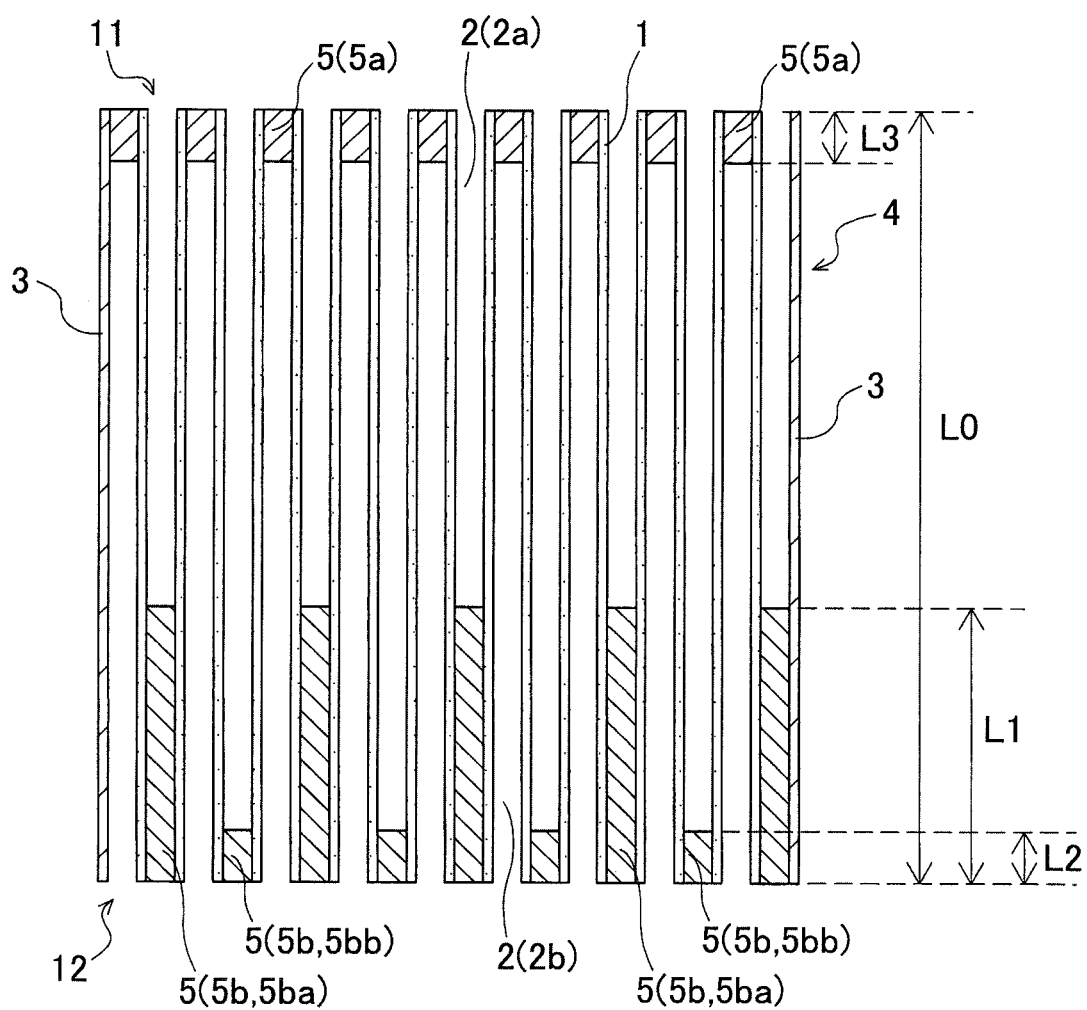
FIG. 4 is a schematic cross-sectional view taken along the line A-A' of FIG. 3.

(1) Honeycomb Filter (First Embodiment):

As shown in FIGS. 1 to 4, a first embodiment of the honeycomb filter of the present invention is a honeycomb filter 100 that includes a honeycomb structure 4 and a plugging portion 5. FIG. 1 is a perspective view schematically showing the first embodiment of a honeycomb filter of the present invention viewed from the inflow end face side. FIG. 2 is a plan view of the honeycomb filter of FIG. 1 viewed from the inflow end face side. FIG. 3 is a plan view of the honeycomb filter of FIG. 1 viewed from the outflow end face side. FIG. 4 is a schematic cross-sectional view taken along the line A-A' of FIG. 3.

The honeycomb structure 4 has a pillar shape, and has a porous partition wall 1 that surrounds a plurality of cells 2. The plurality of cells 2 extends from the inflow end face 11 to the outflow end face 12 of the honeycomb structure 4 and serves as a through channel of fluid. In the honeycomb filter 100, the honeycomb structure 4 has a pillar shape, and further includes a circumferential wall 3 at the outer circumferential face. That is, the circumferential wall 3 surrounds the grid-patterned partition wall 1.

The plugging portion 5 is disposed at open ends of the cells 2 at the inflow end face 11 side or the outflow end face 12 side. In the honeycomb filter 100, the plugging portion 5 disposed at the open ends of the cells 2 on the inflow end face 11 side is called inflow side plugging portions 5a. The plugging portion 5 disposed at the open ends of the cells 2 on the outflow end face 12 side is called outflow side plugging portions 5b. Of the plurality of cells 2, predetermined cells 2 having the inflow side plugging portions 5a and that are open at the outflow end face 12 side are called outflow cells 2b. Of the plurality of cells 2, residual cells 2 having the outflow side plugging portions 5b and that are open at the inflow end face 11 side are called inflow cells 2a.

The outflow side plugging portions 5b include first outflow side plugging portions 5ba and second outflow side plugging portions 5bb. That is, the honeycomb filter 100 has two types of outflow side plugging portions 5b (first outflow side plugging portions 5ba and second outflow side plugging portions 5bb) as the outflow side plugging portions 5b configured as follows.

Let that the length of the first outflow side plugging portions 5ba from the outflow end face 12 is a plugging length L1. Let that the length of the second outflow side plugging portions 5bb from the outflow end face 12 is a plugging length L2. Let that the length of the honeycomb structure 4 from the inflow end face 11 to the outflow end face 12 is the overall length L0. The honeycomb filter 100 of the present embodiment is configured so that the plugging length L1 of the first outflow side plugging portions 5ba is 10 to 50% of the overall length L0 of the honeycomb structure 4. The plugging length L2 of the second outflow side plugging portions 5bb is less than 10% of the overall length L0 of the honeycomb structure 4.

As described above, the honeycomb filter 100 is configured so that the outflow side plugging portions 5b at the outflow end face 12 side include the first outflow side plugging portions 5ba having a relatively long plugging length L1 and the second outflow side plugging portion 5bb having a relatively short plugging length L2. This configuration disperses the distribution of the PM trapped inside the honeycomb filter 100, and so enables a lower maximum temperature during combustion of the PM and a small temperature distribution inside the filter. The first outflow side plugging portions 5ba having a relatively long plugging length L1 increases the heat capacity at the outflow end face 12 side, and so enhances the above-described effect more. The honeycomb filter 100 therefore is capable of having a lower maximum temperature during combustion in the filter regeneration process to burn and remove the PM trapped and removed at the partition wall 1, and enabling a small temperature distribution in the filter.

The plugging length L1 of the first outflow side plugging portions 5ba being less than 10% of the overall length L0 of the honeycomb structure 4 causes the difficulty to disperse the distribution of PM trapped inside the honeycomb filter 100, and fails to have the above-described advantageous effect. The plugging length L1 of the first outflow side plugging portions 5ba exceeding 50% of the overall length L0 of the honeycomb structure 4 extremely shortens the through channel of the inflow cells 2a having these first outflow side plugging portions 5ba, and so increases the pressure loss, for example.

The plugging length L2 of the second outflow side plugging portions 5bb is less than 10% of the overall length L0 of the honeycomb structure 4. In one example, the practical lower limit of the plugging length L2 of the second outflow side plugging portions 5bb can be 1% of the overall length L0 of the honeycomb structure 4. Therefore, the plugging length L2 of the second outflow side plugging portions 5bb is preferably 1% or more and less than 10% of the overall length L0 of the honeycomb structure 4. The specific lower limit of the plugging length L2 of the second outflow side plugging portions 5bb is, for example, 4 mm.

The plugging length L1 of the first outflow side plugging portions 5ba is 10% to 50% of the overall length L0 of the honeycomb structure 4, and is preferably 20 to 40% of the overall length L0 of the honeycomb structure 4 and particularly preferably 25 to 35%. Such a configuration is preferable in terms of the balance between the heat capacity of the honeycomb structure 4 and the heat generation temperature during combustion of the particulate matter, and the influence on the pressure loss.

The number of the first outflow side plugging portions 5ba is not limited especially, and the number of the first outflow side plugging portions 5ba is preferably 10 to 50% of the total number of the outflow side plugging portions 5b, and is more preferably 25 to 35%. Hereinafter, the percentage (%) of the ratio of the number of the first outflow side plugging portions 5ba to the total number of the outflow side plugging portions 5b may be called "the number ratio (%) of the first outflow side plugging portions 5ba". In the honeycomb filter 100 shown in FIGS. 1 to 4, the number ratio of the first outflow side plugging portions 5ba is 25%. The number ratio of the first outflow side plugging portions 5ba being less than 10% or exceeding 50% may cause an uneven distribution of the PM trapped inside the honeycomb filter 100. The number ratio of the first outflow side plugging portions 5ba exceeding 40% may cause an increase in pressure loss of the honeycomb filter 100.

The length L0 of the honeycomb structure 4 is not limited especially. In one example, the length L0 of the honeycomb structure 4 is preferably 100 to 350 mm. The honeycomb filter 100 with this configuration can favorably operate as a filter to trap the PM in exhaust gas. In particular, such a honeycomb filter can particularly favorably operate as a filter loaded with a catalyst for purifying nitrogen oxides to improve the mountability on a vehicle and the purifying performance of nitrogen oxides.

The positions and arrangement of the first outflow side plugging portions 5ba and the second outflow side plugging portions 5bb in the outflow side plugging portion 5b are not particularly limited, and the followings are preferable embodiments for them. Let that, on the outflow end face 12 side of the honeycomb structure 4, a direction of arranging the plurality of cells 2 in one direction is a first direction and a direction orthogonal to the first direction is a second direction. For example, FIG. 3 shows an example of the honeycomb structure 4 having quadrangular cells 2 on the outflow end face 12 side. In this case, the horizontal direction of the sheet is the first direction, and the vertical direction of the sheet is the second direction.

The following describes a preferred embodiment for the arrangement of the first outflow side plugging portions 5ba and the second outflow side plugging portions 5bb. First, adjacent cells 2 along the first direction and adjacent cells 2 along the second direction are preferably each plugged alternately with an inflow side plugging portion 5a and an outflow side plugging portion 5b. In other words, inflow cells 2a and outflow cells 2b are preferably placed alternately via the partition wall 1 on the outflow end face 12 side of the honeycomb structure 4. Of the outflow side plugging portions 5b along the first direction or the second direction, the first outflow side plugging portions 5ba and the second outflow side plugging portions 5bb are preferably placed to be adjacent in any one of the first direction and the second direction. This configuration favorably disperses the distribution of the PM trapped inside the honeycomb filter 100.

Of the outflow side plugging portions 5b along the first direction or the second direction, the number of the first outflow side plugging portions 5ba placed continuously is preferably 4 or less. This configuration more favorably disperses the distribution of the PM trapped inside the honeycomb filter 100. If five or more of the first outflow side plugging portions 5ba are continuously placed in the first direction or the second direction, the dispersion of the PM may become insufficient in the range where these first outflow side plugging portions 5ba are continuously placed. In one of the favorable embodiments of the honeycomb structure 4, these first outflow side plugging portions 5ba and second outflow side plugging portions 5bb have a predetermined repeated arrangement pattern on the outflow end face 12 side.

The plugging length L3 of the inflow side plugging portions 5a from the inflow end face 11 is not limited especially. Preferably the plugging length L3 of the inflow side plugging portions 5a is less than 10% of the overall length L0 of the honeycomb structure 4. This configuration effectively suppresses an excessive increase of the pressure loss of the honeycomb filter 100.

Preferably the partition wall 1 of the honeycomb filter 100 has porosity of 30 to 70%, and more preferably 40 to 70%. The porosity of the partition wall 1 is a value measured using mercury porosimeter by mercury intrusion porosimetry in accordance with JIS R1655: 2003. The porosity of the partition wall 1 can be measured using AUTOPORE 9500 (product name) produced by Micromeritics Co, for example. To measure the porosity, a part of the partition wall 1 may be cut out from the honeycomb filter 100 to prepare a test piece for the measurement. Preferably the porosity of the partition wall 1 is 30% or more, and more preferably 35% or more from the viewpoint of suppressing the pressure loss. The porosity of the partition wall 1 exceeding 70% is not preferable from the viewpoint of keeping the strength of the honeycomb structure 4, and more preferably the porosity is 68% or less.

The thickness of the partition wall 1 is not limited especially, and the thickness is preferably 200 to 390 μm, and more preferably 240 to 320 μm, for example. The thickness of the partition wall 1 can be measured with a scanning electron microscope or a microscope, for example. Too small thicknesses of the partition wall 1 are not preferable because of deterioration in filtration performance. Too large thicknesses of the partition wall 1 are not preferable because of an increase in pressure loss.

The shape of the cells 2 in the honeycomb structure 4 is not limited especially. For instance, the cells 2 may have a polygonal shape, a circular shape, an elliptic shape, and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, or an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively. In the present invention, the cells 2 refer to a space surrounded with the partition wall 1.

Preferably the cells 2 defined by the partition wall 1 have cell density that is 30 to 80 cells/cm$^2$, and 40 to 70 cells/cm$^2$ more preferably. The honeycomb filter 100 with this configuration can operate favorably as a filter to purify exhaust gas emitted from an automobile engine.

The circumferential wall 3 of the honeycomb structure 4 may be monolithic with the partition wall 1 or may be a circumference coating layer that is formed by applying a circumference coating material on the outer circumference of the partition wall 1. In one example not shown, during the manufacturing process, the partition wall and the circumferential wall may be formed in a monolithic manner, and then the circumferential wall formed may be removed by a known method, such as grinding. Then, the circumference coating layer may be disposed on the outer circumference of the partition wall.

The shape of the honeycomb structure 4 is not limited especially. Examples of the shape of the honeycomb structure 4 include a pillar shape in which the inflow end face 11 and the outflow end face 12 have a shape, such as a circle, an ellipse, or a polygon.

The size of the honeycomb structure 4, including the length from the inflow end face 11 to the outflow end face 12 and the size of a cross section orthogonal to the extending direction of the cells 2 of the honeycomb structure 4, is not limited especially. The size of the honeycomb filter 100 may be selected appropriately so that the honeycomb filter can have the optimum ability for purifying when it is used as a filter to purify exhaust gas.

The plugging portion 5 preferably is made of a material that is a preferable material of the partition wall 1. The plugging portion 5 and the partition wall 1 may be made of the same material or of different materials.

In the honeycomb filter 100, the partition wall 1 defining the plurality of cells 2 is preferably loaded with a catalyst for purifying exhaust gas. The partition wall 1 being loaded with a catalyst refers to coating of the catalyst at the surface of the partition wall 1 or at the inner walls of pores formed in the partition wall 1. This configuration changes CO, NOx, HC or the like in the exhaust gas into harmless substances through the catalytic reaction. This also can promote the oxidization of the trapped PMs, such as soot. Examples of the catalyst for purifying exhaust gas include an oxidation catalyst that promotes the oxidation of PM such as soot and a nitrogen-oxide reduction catalyst that purifies nitrogen oxides.

Figure 5:
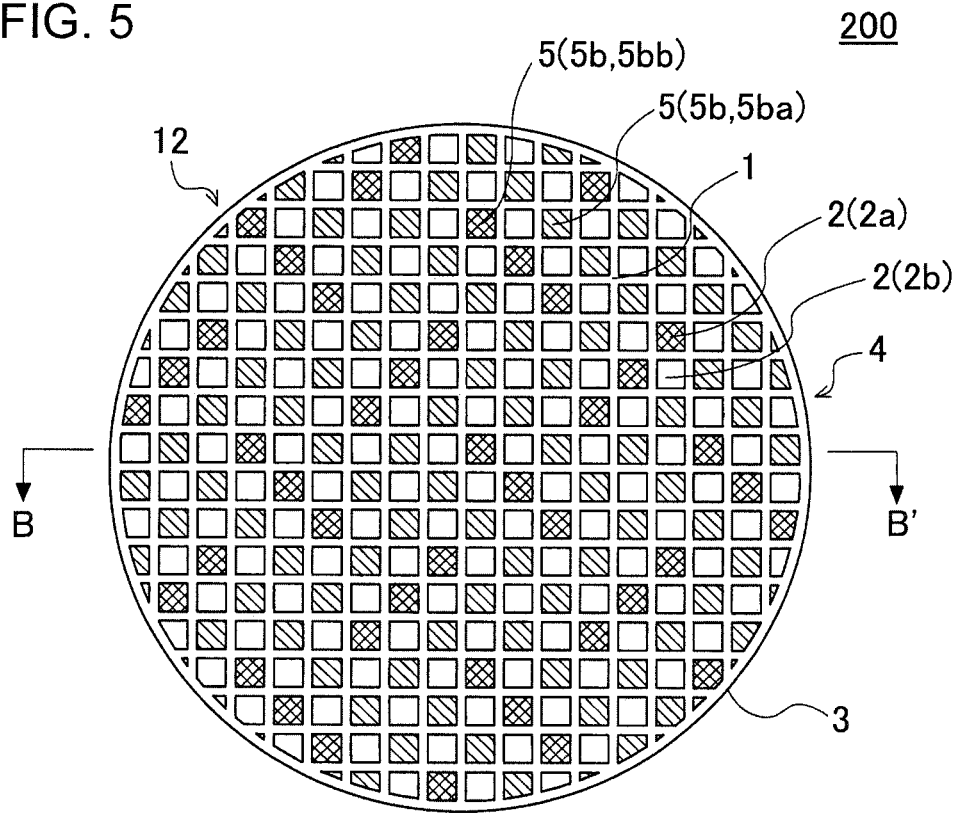
FIG. 5 is a plan view schematically showing a second embodiment of a honeycomb filter of the present invention viewed from the outflow end face side.
Figure 6:
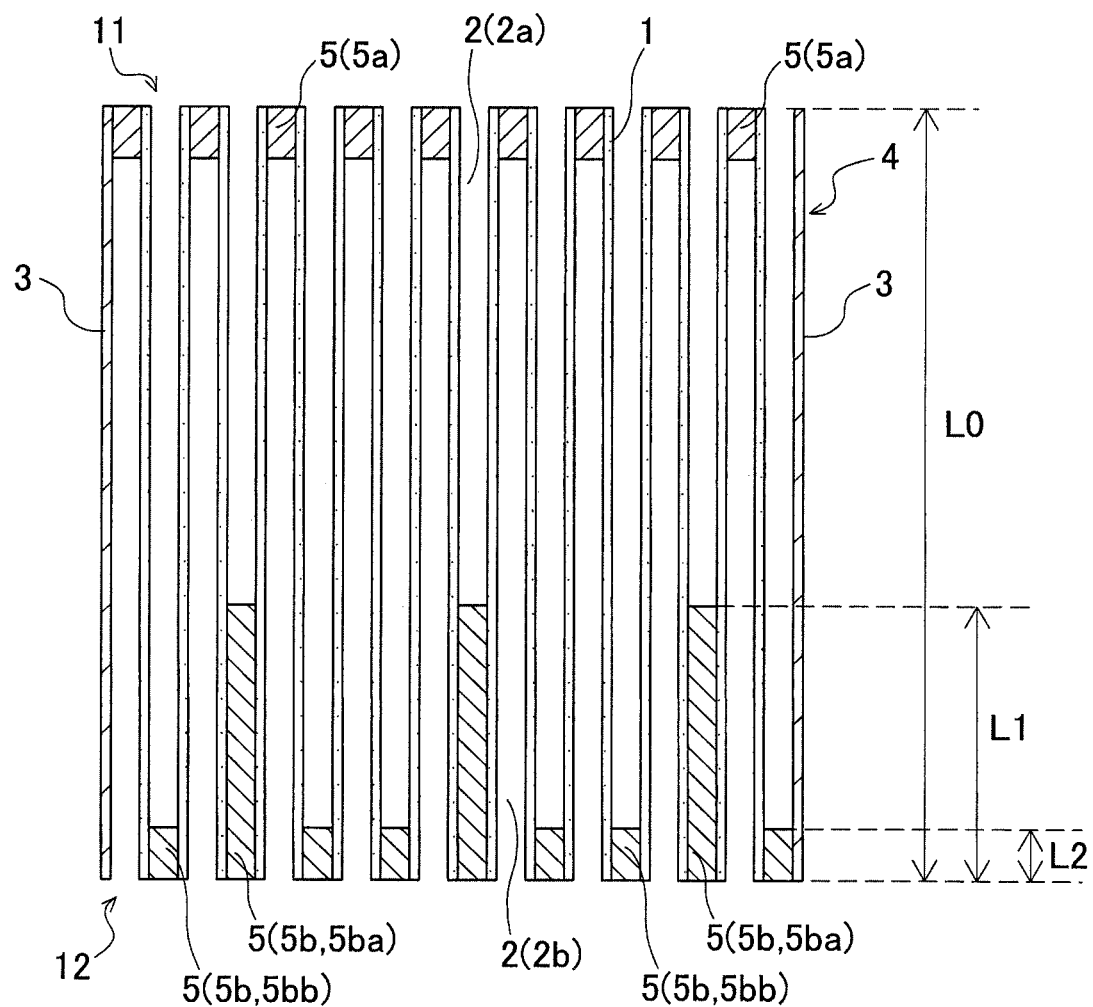
FIG. 6 is a schematic cross-sectional view taken along the line B-B' of FIG. 5.

(2) Honeycomb Filters (Second Embodiment to Sixth Embodiment):

The following describes other embodiments of the honeycomb filter of the present invention. As shown in FIGS. 5 to 6, a second embodiment of the honeycomb filter of the present invention is a honeycomb filter 200 that includes a honeycomb structure 4 and a plugging portion 5. FIG. 5 is a plan view schematically showing the second embodiment of a honeycomb filter of the present invention viewed from the outflow end face side. FIG. 6 is a schematic cross-sectional view taken along the line B-B' of FIG. 5.

As shown in FIGS. 5 to 6, the honeycomb structure 4 has a pillar shape, and has a porous partition wall 1 that surrounds a plurality of cells 2. The plurality of cells 2 extends from the inflow end face 11 to the outflow end face 12 of the honeycomb structure 4 and serves as a through channel of fluid. The honeycomb structure 4 may have the same configuration as the above-mentioned honeycomb structure 4 of the honeycomb filter 100 shown in FIGS. 1 to 4.

As shown in FIGS. 5 to 6, the plugging portion 5 includes inflow side plugging portions 5a disposed at open ends of the cells 2 on the inflow end face 11 side and outflow side plugging portions 5b disposed at open ends of the cells 2 on the outflow end face 12 side. Of the plurality of cells 2, the cells 2 having the inflow side plugging portions 5a are outflow cells 2b, and the cells 2 having the outflow side plugging portions 5b are inflow cells 2a.

The honeycomb filter 200 shown in FIGS. 5 to 6 is different from the honeycomb filter 100 shown in FIGS. 1 to 4 in the positions and arrangement of the first outflow side plugging portions 5ba and the second outflow side plugging portions 5bb. The honeycomb filter 200 can have the same configuration as that of the honeycomb filter 100 other than the positions and arrangement of the first outflow side plugging portions 5ba and the second outflow side plugging portions 5bb.

The honeycomb filter 200 shown in FIGS. 5 to 6 is configured so that the number ratio (%) of the first outflow side plugging portions 5ba is 33%. The first outflow side plugging portions 5ba and the second outflow side plugging portions 5bb are placed to have a certain repeating unit on the outflow end face 12 of the honeycomb structure 4.

Figure 7:
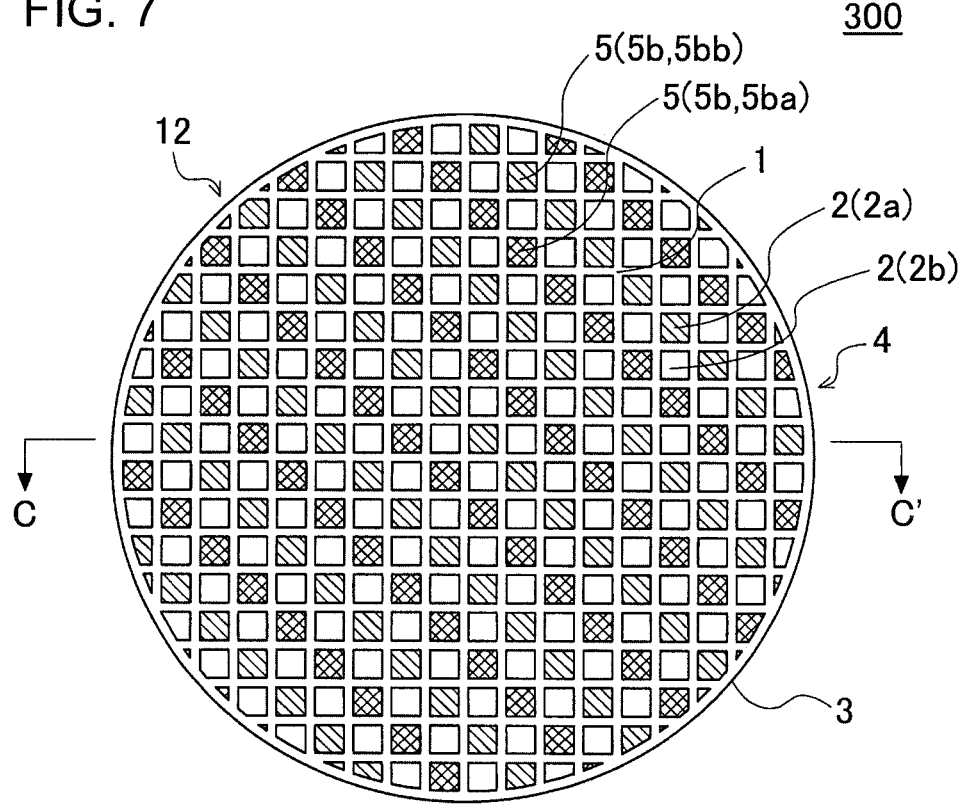
FIG. 7 is a plan view schematically showing a third embodiment of a honeycomb filter of the present invention viewed from the outflow end face side.
Figure 8:
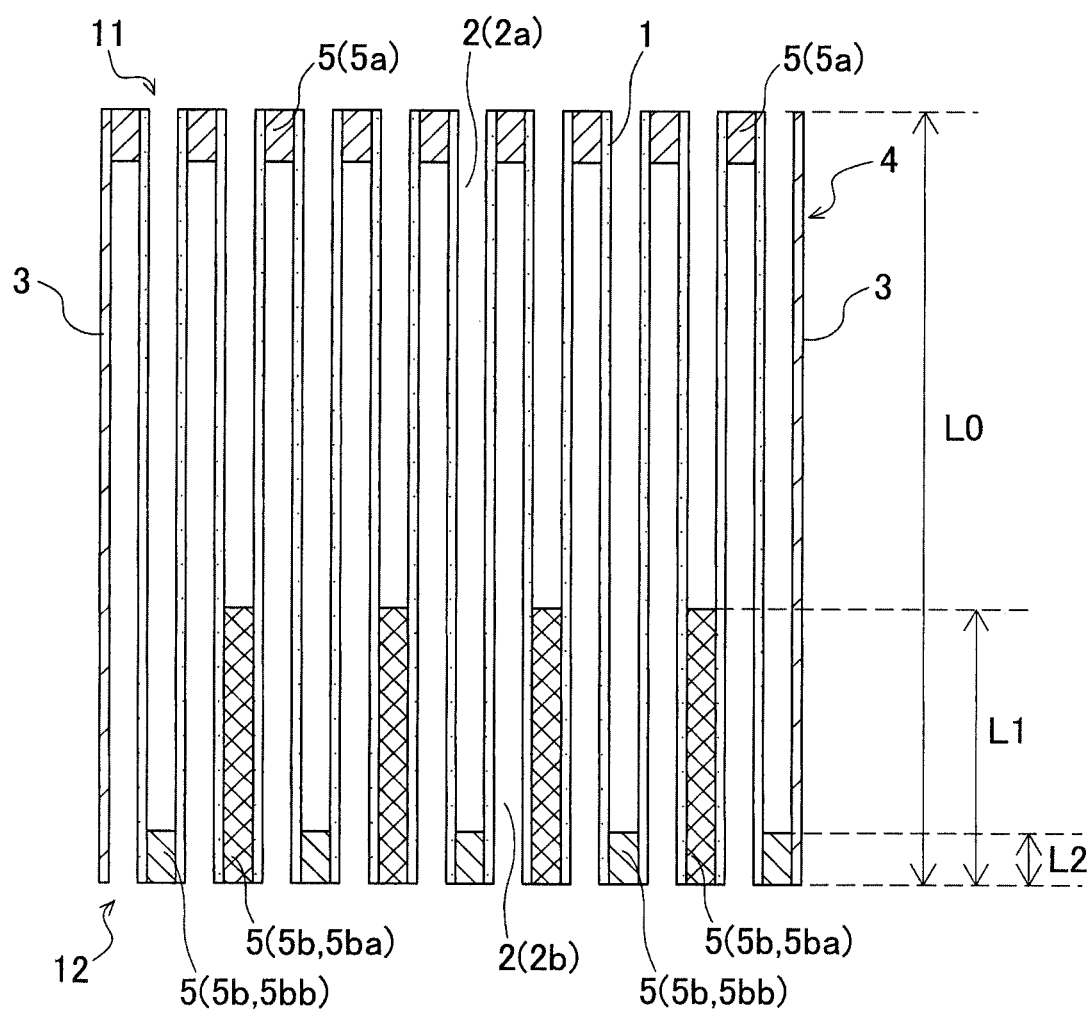
FIG. 8 is a schematic cross-sectional view taken along the line C-C' of FIG. 7.

As shown in FIGS. 7 to 8, a third embodiment of the honeycomb filter of the present invention is a honeycomb filter 300 that includes a honeycomb structure 4 and a plugging portion 5. FIG. 7 is a plan view schematically, showing the third embodiment of a honeycomb filter of the present invention viewed from the outflow end face side. FIG. 8 is a schematic cross-sectional view taken along the line C-C' of FIG. 7.

The honeycomb filter 300 shown in FIGS. 7 to 8 is different from the honeycomb filter 100 shown in FIGS. 1 to 4 in the positions and arrangement of the first outflow side plugging portions 5ba and the second outflow side plugging portions 5bb. The honeycomb filter 300 can have the same configuration as that of the honeycomb filter 100 other than the positions and arrangement of the first outflow side plugging portions 5ba and the second outflow side plugging portions 5bb.

The honeycomb filter 300 shown in FIGS. 7 to 8 is configured so that the number ratio (%) of the first outflow side plugging portions 5ba is 50%. The first outflow side plugging portions 5ba and the second outflow side plugging portions 5bb are placed to have a certain repeating unit on the outflow end face 12 of the honeycomb structure 4.

Figure 9:
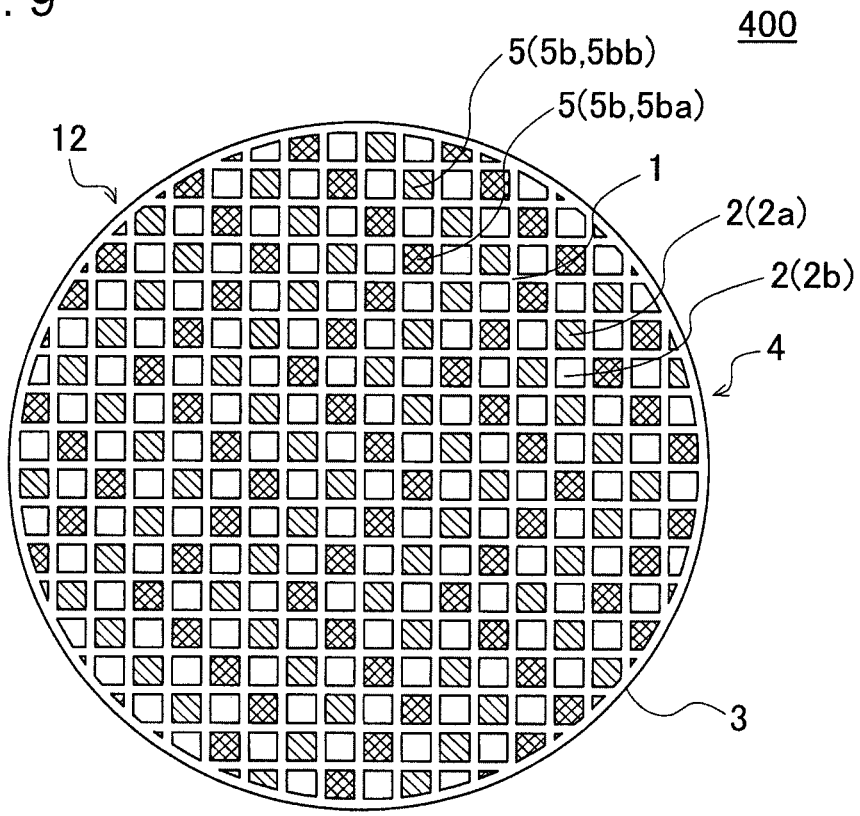
FIG. 9 is a plan view schematically showing a fourth embodiment of a honeycomb filter of the present invention viewed from the outflow end face side.

In another embodiment shown in FIG. 9, a honeycomb filter 400 may be configured so that, similarly to the honeycomb filter 300 of FIGS. 7 to 8, the number ratio (%) of the first outflow side plugging portions 5ba is 50%. FIG. 9 is a plan view schematically showing the fourth embodiment of a honeycomb filter of the present invention viewed from the outflow end face side. The honeycomb filter 400 shown in FIG. 9 can have the same configuration as that of the honeycomb filter 300 shown in FIGS. 7 to 8 other than the positions of the first outflow side plugging portions 5ba and the second outflow side plugging portions 5bb.

Figure 10:
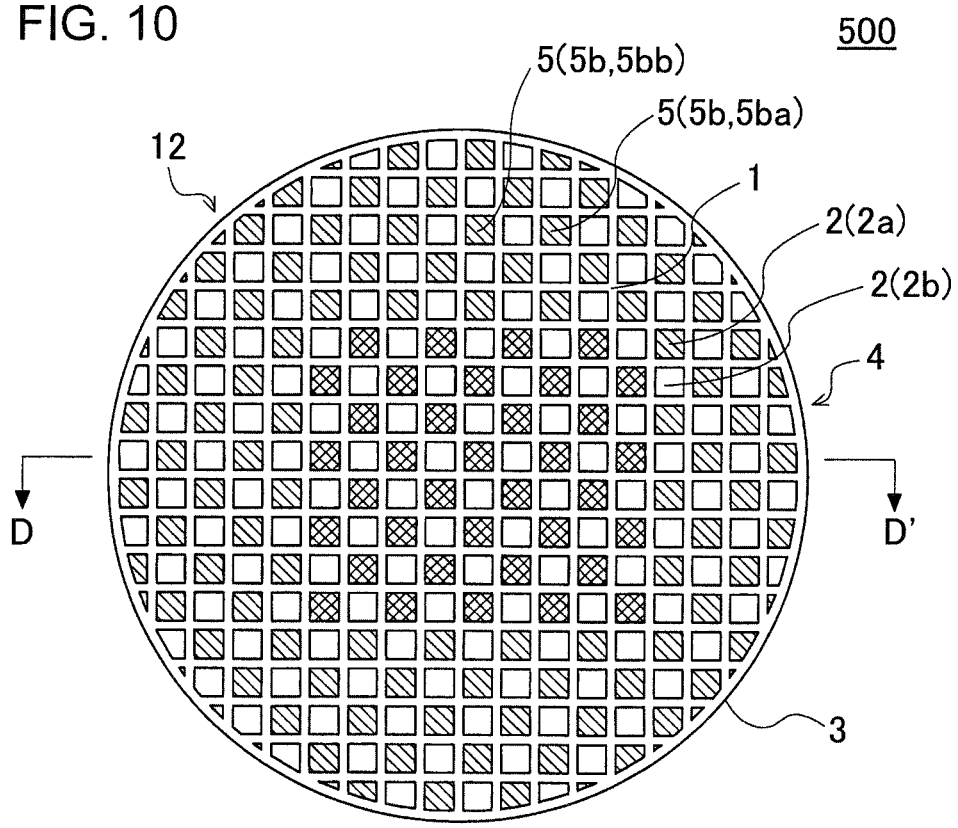
FIG. 10 is a plan view schematically showing a fifth embodiment of a honeycomb filter of the present invention viewed from the outflow end face side.
Figure 11:
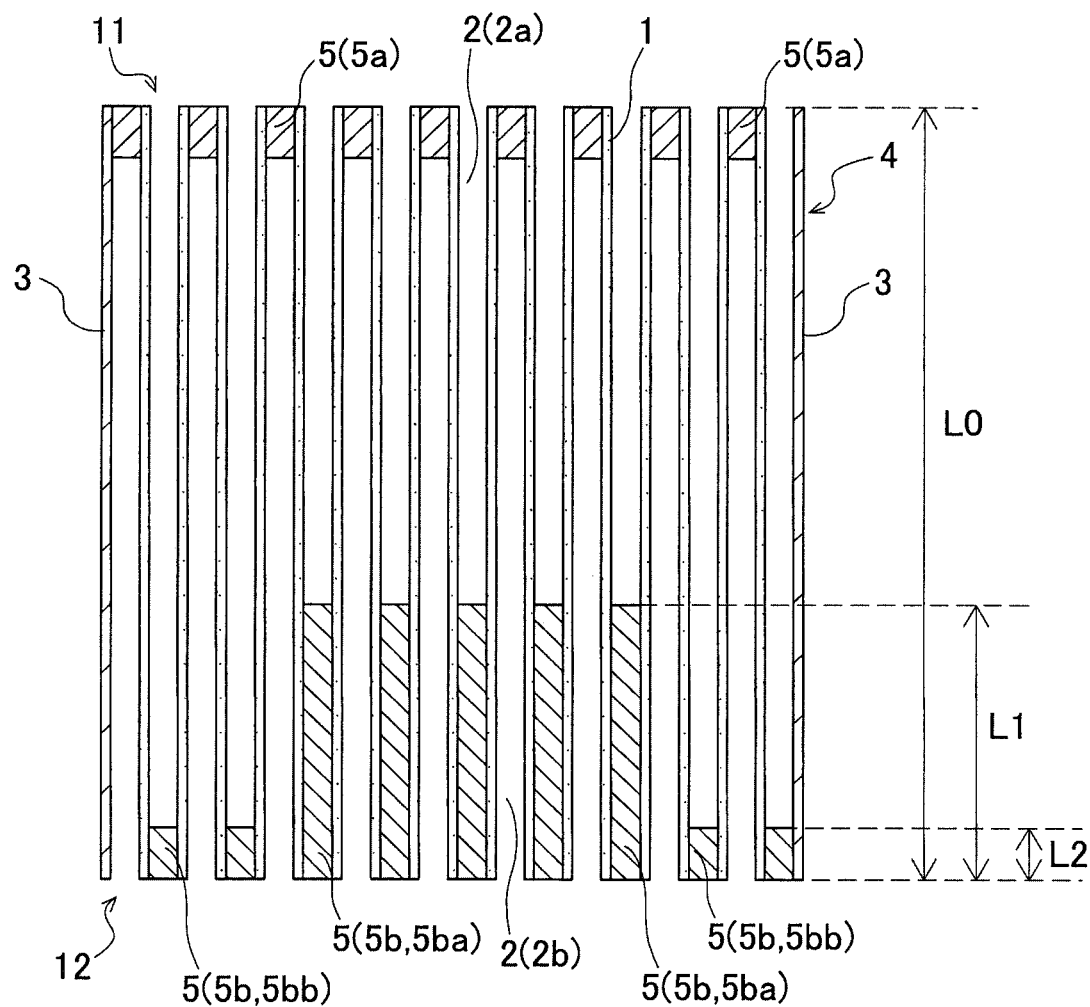
FIG. 11 is a schematic cross-sectional view taken along the line D-D' of FIG. 10.
Figure 12:
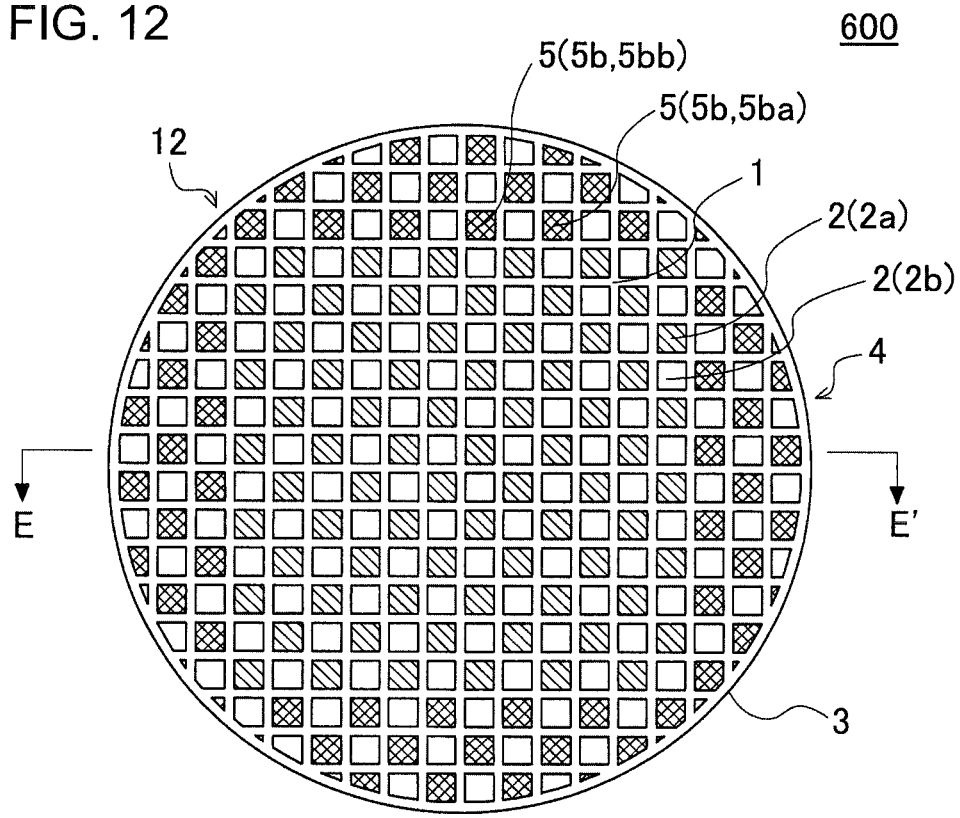
FIG. 12 is a plan view schematically showing a sixth embodiment of a honeycomb filter of the present invention viewed from the outflow end face side.
Figure 13:
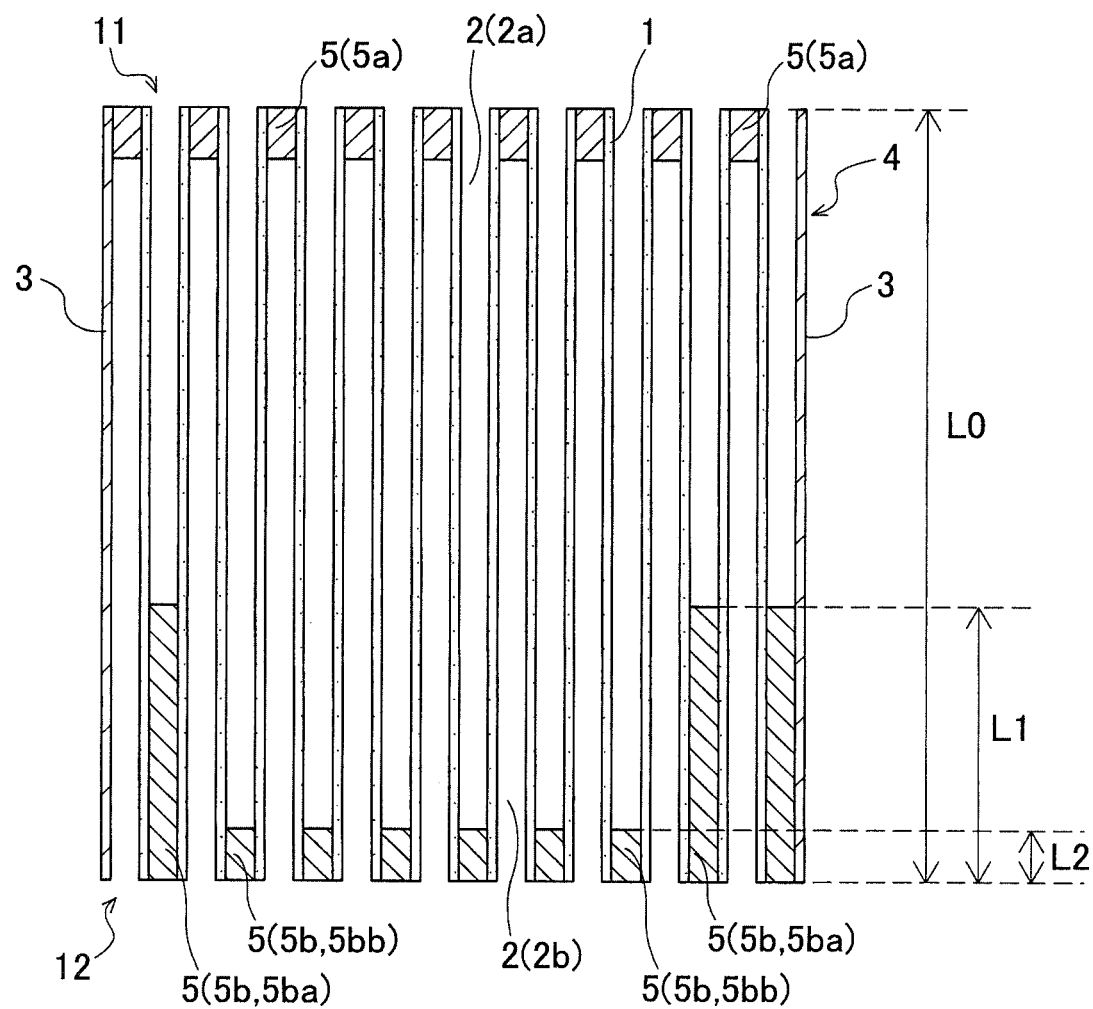
FIG. 13 is a schematic cross-sectional view taken along the line E-E' of FIG. 12.

As shown in FIGS. 10 to 11, a fifth embodiment of the honeycomb filter of the present invention is a honeycomb filter 500 that includes a honeycomb structure 4 and a plugging portion 5. As shown in FIGS. 12 to 13, a sixth embodiment of the honeycomb filter of the present invention is a honeycomb filter 600 that includes a honeycomb structure 4 and a plugging portion 5. FIG. 10 is a plan view schematically showing the fifth embodiment of a honeycomb filter of the present invention viewed from the outflow end face side. FIG. 11 is a schematic cross-sectional view taken along the line D-D' of FIG. 10. FIG. 12 is a plan view schematically showing the sixth embodiment of a honeycomb filter of the present invention viewed from the outflow end face side. FIG. 13 is a schematic cross-sectional view taken along the line E-E' of FIG. 12.

The honeycomb filter 500 shown in FIGS. 10 to 11 and the honeycomb filter 600 shown in FIGS. 12 to 13 are different from the honeycomb filter 100 shown in FIGS. 1 to 4 in the positions and arrangement of the first outflow side plugging portions 5ba and the second outflow side plugging portions 5bb. These honeycomb filters can have the same configuration as that of the honeycomb filter 100 other than the positions and arrangement of the first outflow side plugging portions 5ba and the second outflow side plugging portions 5bb.

In the honeycomb filter 500 shown in FIGS. 10 to 11, the first outflow side plugging portions 5ba gather on a center part of the outflow end face 12 of the honeycomb structure 4. In the honeycomb filter 600 shown in FIGS. 12 to 13, the first outflow side plugging portions 5ba gather on an outer circumference part of the outflow end face 12 of the honeycomb structure 4. The honeycomb filters 500 and 600 with these configurations also are capable of having a lower maximum temperature during combustion in the filter regeneration process to burn and remove the PM trapped and removed at the partition wall 1, and enabling a small temperature distribution in the filter. Note here that, as in the honeycomb filters 100, 200, 300, and 400 shown in FIGS. 1 to 9, the first outflow side plugging portions 5ba are preferably distributed evenly without gathering locally on the outflow end face 12 side of the honeycomb structure 4. In particular, as described above, of the outflow side plugging portions 5b placed along the first direction or the second direction on the outflow end face 12 side of the honeycomb structure 4, the number of the first outflow side plugging portions 5ba placed continuously is preferably 4 or less.

In another embodiment of the honeycomb filter of the present invention, the honeycomb structure of the honeycomb filter may be a bonded body of a plurality of pillar-shaped honeycomb segments. These pillar-shaped honeycomb segments are bonded at their lateral faces via a bonding layer to form a single honeycomb structure. Each honeycomb segment includes a porous partition wall disposed to surround a plurality of cells, and the plurality of cells extends from the inflow end face to the outflow end face of the honeycomb segment and serves as a through channel of fluid. Similarly, to the above-described embodiments, the cells defined by the partition wall each comes with an inflow side plugging portion or an outflow side plugging portion at the open end. The outflow side plugging portions include first outflow side plugging portions and second outflow side plugging portions each having a desired plugging length. Hereinafter a honeycomb structure including a bonded body of a plurality of honeycomb segments may be called a "honeycomb segment bonded body". The honeycomb filter including such a honeycomb structure may be called a "segmented structured honeycomb filter". A honeycomb segment having the inflow side plugging portions or outflow side plugging portions may be called a "plugged honeycomb segment".

(3) Method for Manufacturing Honeycomb Filter:

There is no particular limitation on the method for manufacturing the honeycomb filter of the present embodiment shown in FIGS. 1 to 4, and the honeycomb filter can be manufactured by the following method, for example.

To manufacture the honeycomb filter, a kneaded material having plasticity is firstly prepared to produce a honeycomb structure. The kneaded material to produce the honeycomb structure can be prepared by a conventionally-known method for manufacturing a honeycomb filter.

Next, the obtained kneaded material is extruded, thus producing a honeycomb formed body having a partition wall defining a plurality of cells, and an outer wall surrounding this partition wall. The obtained honeycomb formed body is preferably dried by microwaves and hot air, for example.

One of the open ends of each cell in the obtained honeycomb formed body is filled with a plugging material to produce a plugging portion to plug the open ends of the cells. The plugging material may be prepared with a material similar to that of the honeycomb formed body, for example. When filling the open ends of the cells with the plugging material, the filling depth of the plugging material is adjusted so as to include the mixture of lengths of 10 to 50% of the length L0 of the honeycomb structure and lengths that are less than 10% of the length L0 of the honeycomb structure. After forming the plugging portion, the honeycomb formed body may be dried again.

The following describes each step of the method for manufacturing the honeycomb filter of the present invention in more details. The steps of the manufacturing method described below relate to a method for manufacturing a segmented structured honeycomb filter.

(3-1) Honeycomb Segment Manufacturing Step:

Each honeycomb segment can be manufactured by a conventionally known method. More specifically, binder, pore former, surfactant, and liquid medium such as water are added to a material of the honeycomb segment containing silicon carbide and a bonding material, followed by kneading to prepare a kneaded material having plasticity. Examples of the binder include methyl cellulose, hydroxypropoxyl cellulose, hydroxyethylcellulose, carboxymethylcellulose, and polyvinyl alcohol. The prepared kneaded material is shaped into a pillar shape, followed by drying. After that, this is fired, followed by oxidation treatment to produce a honeycomb segment.

The kneading method, the method of shaping the prepared kneaded material into a pillar-shaped body, and the drying method are not particularly limited. For the kneading method, a kneader or a vacuum pugmill may be used, for example. As the method for shaping the prepared kneaded material into a pillar shape, a conventionally known method can be used, such as extrusion, injection molding, and press molding. Among these, a method of extruding the prepared kneaded material with a die for shaping a honeycomb segment is preferable. The die is to shape the kneaded material to have a desired outer wall thickness, partition wall thickness, and cell density. The method for drying may be a conventionally known method, such as hot air drying, microwave drying, dielectric drying, reduced-pressure drying, vacuum drying, and freeze-drying. Among them, a drying method including hot air drying in combination with microwave drying or dielectric drying is preferable because this enables drying as a whole quickly and uniformly.

The firing may be conducted in a firing oven, for example. The firing oven and the firing conditions may be selected as needed to be suitable for the shape, the material and the like of the honeycomb segment. The honeycomb segment may be calcinated before the firing to burn and remove organic substances, such as binder.

The oxidation treatment can be conducted by a conventionally known method. Specifically, the fired honeycomb segment including silicon carbide may be heated in an oxygen atmosphere (for example, an oxygen concentration of 15 to 20 mass %) to 900 to 1400° C. to partially oxidize the silicon carbide of the honeycomb segment.

(3-2) Plugged Honeycomb Segment Manufacturing Step:

This step fills predetermined cells of the honeycomb segment, which is produced in the honeycomb segment manufacturing step, with a slurry for plugging to produce a honeycomb segment having plugging portions (plugged honeycomb segment).

The plugging portion can be formed in the cells by a conventionally known method. More specifically, a sheet is attached to an end face of the honeycomb segment. After that, holes are formed at positions of the sheet corresponding to the cells where the plugging portion is to be formed. While leaving this sheet attached, this end face is immersed in slurry for plugging to fill the open ends of the cells in which the plugging portion is to be formed with the slurry via the holes of the sheet. After that, the honeycomb segment filled with the slurry is dried and fired. The material of the plugging slurry contains silicon carbide. The material containing silicon carbide in this way forms fibers at the plugging portion when the plugging portion is exposed to a high temperature. Observation of these fibers enables a determination that the honeycomb filter has been exposed to a high temperature.

The plugging portion of the present invention is required to have an exposure region where no protective layer is formed on the surface. To this end, oxidation treatment is preferably not performed after the formation of plugging portion. Note here that oxidation treatment may be performed so as not to form a protective layer (i.e., the layer containing 40 mass % or more of silicon and 40 mass % or more of oxygen, and having a thickness of 0.5 µm or more) on the surface of the plugging portion.

(3-3) Bonded Body Manufacturing Step:

This step bonds plugged honeycomb segments with bonding slurry for mutual bonding to produce a bonded body. For the bonding slurry, a conventionally known one can be appropriately used.

(3-4) Other Steps:

The outer circumferential portion of the bonded body may be cut to have a desired outer circumferential shape. The cutting method is not limited particularly, and a conventional known method can be used.

As described above, a circumference coating material may be applied on the outer circumference of the bonded body having the cut outer circumferential portion to form a circumference coating layer. In this way, a honeycomb filter with circumference coating layer can be obtained. Such a circumference coating layer prevents chipping of the honeycomb filter when external force is applied to the honeycomb filter.

The circumference coating material may be prepared, for example, by adding an additive such as organic binder, foamable resin or dispersing agent to inorganic raw materials including inorganic fiber, colloidal silica, clay, SiC particles and adding water thereto, followed by kneading. The circumference coating material may be applied by coating with a rubber spatula while rotating the "cut bonded body" on a wheel, for example.

The honeycomb filter with circumference coating layer is then immersed in slurry for catalyst to load the surface of the partition wall of this honeycomb filter with catalyst.

EXAMPLES

The following describes the present invention more specifically by way of examples, and the present invention is by no means limited to these examples.

Example 1

Materials of the honeycomb segments were the mixture of SiC powder and metal Si powder at the mass ratio of 80:20. Starch and foamable resin as the pore former were added, and methyl cellulose, hydroxypropyl methyl cellulose, surfactant and water were further added thereto, followed by kneading. In this way a kneaded material having plasticity was prepared.

Next, the prepared kneaded material was extruded, dried, fired, and then oxidized to obtain a prismatic columnar honeycomb segment. A protective layer was formed on the surface of this prismatic columnar honeycomb segment. Then, predetermined cells of the obtained prismatic columnar honeycomb segment were filled with slurry for plugging, and this was dried to obtain a plugged prismatic columnar honeycomb segment. An example of the method for forming the plugging portion is described below. Slurry for plugging is stored in a storage container. Next, a mask having openings at positions corresponding to the cells in which the plugging portions are to be formed is attached to one bottom surface. The masked bottom surface is immersed in the storage container, and the open ends of the cells are filled with the slurry to form a plugging portion. For the outflow side plugging portions, first outflow side plugging portions are filled first with the slurry so that the plugging length L1 becomes 10% of the overall length L0' of the honeycomb formed body, followed by drying. After that, second outflow side plugging portions are filled with the slurry so that the plugging length L2 becomes 3.7% of the overall length L0' of the honeycomb formed body, followed by drying. In this way, the outflow side plugging portions including the first outflow side plugging portions and the second outflow side plugging portions are formed.

The material of the plugging slurry was the same as that of the kneaded material. The plugging portion was arranged so that one end face and the other end face had a complementary checkered pattern. The prismatic columnar honeycomb segments had the cell density of 46 cells/cm² and the thickness of the partition wall of 320 μm.

In this way sixteen prismatic columnar honeycomb segments with plugged portions were obtained. Next, a paste-like bonding material was applied to each outer wall of these honeycomb segments, and the honeycomb segments were placed and assembled to be 4×4 in the vertical and horizontal directions in a cross section orthogonal to the cell extending direction. After that, pressure was applied from all sides. Then, the bonding material was dried to obtain a bonded body. Next, this bonded body was cut at the outer circumferential portion so that the outer shape was a round pillar shape. After that, a circumferential coating material was applied to the outer circumferential surface to produce a round pillar-shaped honeycomb filter.

The obtained honeycomb filter had the diameter in a cross section orthogonal to the cell extending direction that was 163 mm, and the length in the cell extending direction that was 162 mm. The honeycomb filter had the thickness of the bonding layer that was 1.0 mm. The honeycomb filter had the partition wall thickness of 320 μm and the cell density of 46 cells/cm². The porosity of the partition wall was 63%. The porosity of the partition wall was a value measured by mercury intrusion porosimetry.

The honeycomb filter of Example 1 had the number ratio of the first outflow side plugging portions to the total number of the outflow side plugging portions that was 25%. Table 1 shows the result in the column of "Number ratio (%) of 1st outflow side plugging portions". The first outflow side plugging portions and the second outflow side plugging portions on the outflow end face were arranged like the honeycomb filter 100 shown in FIG. 3. The column "Ref. drawing" in Table 1 indicates the number of drawing to be referred to about the arrangement of the first outflow side plugging portions and the second outflow side plugging portions for Examples.

The honeycomb filter of Example 1 had the ratio of the plugging length L1 of the first outflow side plugging portions to the overall length L0 of the honeycomb structure that was 10%. The ratio of the plugging length L2 of the second outflow side plugging portions to the overall length L0 of the honeycomb structure was 3.7%. The ratio of the plugging length L3 of the inflow side plugging portions to the overall length L0 of the honeycomb structure was 3.7%. Table 1 indicates these results in the columns of "plugging length L1 ratio (%)", "plugging length L2 ratio (%)" and "plugging length L3 ratio (%)".

The honeycomb filter of Example 1 had the ratio of heat capacity to the honeycomb filter of Comparative Example 1 described later that was 102.4%. The column of "heat capacity ratio (%)" in Table 1 indicates the percentage (%) of the ratio of the heat capacity of the honeycomb filter of each example to the heat capacity of the honeycomb filter of Comparative Example 1.

TABLE 1

|  | Comp. Ex. 1 | Ex. 1 | Ex. 2 | Ex. 3 | Ex. 4 | Ex. 5 | Ex. 6 |
|---|---|---|---|---|---|---|---|
| Number ratio (%) of 1st outflow side plugging portions | 0.0 | 25.0 | 25.0 | 25.0 | 33.3 | 33.3 | 33.3 |
| Ref. drawing | — | FIG. 3 | FIG. 3 | FIG. 3 | FIG. 5 | FIG. 5 | FIG. 5 |
| Plugging length L1 ratio (%) | — | 10.0 | 30.0 | 50.0 | 10.0 | 30.0 | 50.0 |
| Plugging length L2 ratio (%) | 3.7 | 3.7 | 3.7 | 3.7 | 3.7 | 3.7 | 3.7 |
| Plugging length L3 ratio (%) | 3.7 | 3.7 | 3.7 | 3.7 | 3.7 | 3.7 | 3.7 |
| Heat capacity ratio (%) | 100.0 | 102.4 | 110.1 | 117.7 | 103.21 | 113.4 | 123.7 |
| Estimated max. temperature (° C.) when burning PM | 1080 | 1090 | 1010 | 1060 | 1075 | 1000 | 1060 |

TABLE 2

|  | Comp. Ex. 2 | Ex. 7 | Comp. Ex. 3 | Ex. 8 | Ex. 9 | Ex. 10 | Ex. 11 | Comp. Ex. 4 |
|---|---|---|---|---|---|---|---|---|
| Number ratio (%) of 1st outflow side plugging portions | 50.0 | 50.0 | 100.0 | 50.0 | 50.0 | 50.0 | 50.0 | 50.0 |
| Ref. drawing | FIG. 7 | FIG. 7 | — | FIG. 7 | FIG. 10 | FIG. 12 | FIG. 7 | FIG. 7 |
| Plugging length L1 ratio (%) | 8.0 | 10.0 | 27.3 | 30.0 | 30.0 | 30.0 | 50.0 | 55.0 |
| Plugging length L2 ratio (%) | 3.7 | 3.7 | — | 3.7 | 3.7 | 3.7 | 3.7 | 3.7 |
| Plugging length L3 ratio (%) | 3.7 | 3.7 | 3.7 | 3.7 | 3.7 | 3.7 | 3.7 | 3.7 |
| Heat capacity ratio (%) | 103.3 | 104.9 | 120.1 | 120.1 | 120.1 | 120.1 | 135.4 | 139.3 |
| Estimated max. temperature (° C.) when burning PM | 1055 | 1050 | 1060 | 990 | 1010 | 1010 | 1060 | 1045 |

The honeycomb filter of Example 1 was evaluated about the estimated maximum temperature during combustion of particulate matter by the following method. Table 1 shows the result.

(Estimated Maximum Temperature (° C.) During Combustion of Particulate Matter)

The estimated maximum temperature (° C.) during combustion of particulate matter was calculated for the honeycomb filters of Examples and Comparative Examples based on the engine test and the simulation. Specifically, first, particulate matter was accumulated on the honeycomb filter (the honeycomb structure had the capacity of 3.4 L) of Comparative Example 1 described later so as to be 7 g/L. Then, the particulate matter accumulated in the honeycomb filter of Comparative Example 1 was burned in the engine test, and the temperature distribution and the maximum temperature (° C.) in the honeycomb filter of Comparative Example 1 during burning of the particulate matter were measured. The temperature distribution and the maximum temperature (° C.) during burning of the particulate matter were measured under the worst condition where the combustion temperature of the particulate matter in the filter was the highest. Combustion simulation conditions were set based on the temperature data during this measurement, the characteristics information on the honeycomb filter, and the engine operating conditions. Then with reference to the information on the honeycomb filter of Comparative Example 1, combustion simulation was performed for the honeycomb filters of other Examples and Comparative Examples. From each of the obtained simulation results, the estimated temperature data and the estimated maximum temperature (° C.) of the honeycomb filters of Examples and Comparative Examples were obtained.

Examples 2 to 11

Honeycomb filters were manufactured similarly to the method of Example 1 other than that the structure of the first outflow side plugging portions and the second outflow side plugging portions was changed as shown in Table 1 or Table 2.

Comparative Examples 1 to 4

Honeycomb filters of Comparative Examples 1 to 4 were manufactured similarly to the method of Example 1 other than that the structure of the outflow side plugging portions was changed as shown in Table 1 or Table 2. Specifically, the outflow side plugging portions of Comparative Example 1 included only the outflow side plugging portions having the plugging length L2 that was 3.7% of the overall length L0' of the honeycomb formed body. In Table 1, the column "2nd outflow side plugging portion" indicates the structure of the outflow side plugging portions in Comparative Example 1. The outflow side plugging portions of Comparative Example 3 included only the outflow side plugging portions having the plugging length L1 that was 27.3% of the overall length L0' of the honeycomb formed body. In Table 2, the column "1st outflow side plugging portion" indicates the structure of the outflow side plugging portions in Comparative Example 3. The structures of the outflow side plugging portions of Comparative Examples 2 and 4 are as shown in Table 2.

(Result)

The honeycomb filters of Examples 1 to 11 had a lower estimated maximum temperature during combustion of particulate matter than the honeycomb filter of Comparative Example 1. In particular, Example 8 had the lowest temperature.

The honeycomb filters of Examples 1 to 3, Examples 4 to 6 and Examples 7 to 11 had a higher estimated maximum temperature during combustion of particulate matter as the plugging length L1 ratio increased or decreased. For example, Example 2 is superior to Examples 1 and 3 in that the particulate matter is dispersed in order to enable a lower estimated maximum temperature (° C.) during combustion of the particulate matter. Similarly, Example 5 is superior to Examples 4 and 6 or Example 8 is superior to Examples 7 to 11 and Comparative Examples 2 to 4 in that the particulate matter is dispersed in order to enable a lower estimated maximum temperature (° C.) during combustion of the particulate matter. This shows that the ratio of the plugging length L1 in the range of at least 10 to 50%, preferably in the range of 20 to 40% leads to a lower estimated maximum temperature during combustion of particulate matter.

Among the honeycomb filters of Examples 8 to 10 and Comparative Example 3, Example 8 having the dispersed distribution of the plugging length L1 lowered the temperature more than in Comparative Example 3 having the same plugging length L1 and plugging length L2 and in Examples 9 and 10 having a locally gathering distribution of the plugging length L1. The result shows that when the number ratio of the first outflow side plugging portions is within the range of 25 to 50%, and the arrangement is not unevenly distributed, the estimated maximum temperature during combustion of particulate matter is low. Among Examples 8 to 10 and Comparative Example 3, Example 8 excellently promotes the movement (dispersion) of heat generated when the particulate matter is burned, because the first outflow side plugging portions are not unevenly distributed. In particular, Example 8, is superior to other examples in the plugging length L1 and the number ratio of the first outflow side plugging portions that are configured to disperse the accumulation distribution of the particulate matter, and in the balancing of the heat generation during combustion of the particulate matter and heat capacity.

The honeycomb filter of the present invention can be used for a trapping filter to remove particulates and the like in exhaust gas.

DESCRIPTION OF REFERENCE NUMERALS

1: Partition wall, 2: Cell, 2a: Inflow cell, 2b: Outflow cell, 3: Circumferential wall, 4: Honeycomb structure, 5: Plugging portion, 5a: Inflow side plugging portion, 5b: Outflow side plugging portion, 5ba: First outflow side plugging portion, 5bb: Second outflow side plugging portion, 11: Inflow end face, 12: Outflow end face, 100, 200, 300, 400, 500, 600: Honeycomb filter, L0: Overall length (overall length of honeycomb structure), L1: Plugging length (plugging length of first outflow side plugging portions), L2: Plugging length (plugging length of second outflow side plugging portions), L3: Plugging length (plugging length of inflow side plugging portions)

What is claimed is:

1. A honeycomb filter comprising: a pillar-shaped honeycomb structure having an inflow end face and an outflow end face and comprising a porous partition wall disposed so as to surround a plurality of cells, the plurality of cells extending from the inflow end face to the outflow end face and serving as a through channel of fluid;

inflow side plugging portions disposed at open ends of predetermined cells of the plurality of cells on the inflow end face side; and outflow side plugging portions disposed at open ends of residual cells other than the predetermined cells of the plurality of cells on the outflow end face side, wherein the outflow side plugging portions comprise first outflow side plugging portions and second outflow side plugging portions, let that a length of the honeycomb structure from the inflow end face to the outflow end face is an overall length L0, a length of the first outflow side plugging portions from the outflow end face is a plugging length L1, and a length of the second outflow side plugging portions from the outflow end face is a plugging length L2, the plugging length L1 of the first outflow side plugging portions is 10 to 50% of the overall length L0 of the honeycomb structure, and the plugging length L2 of the second outflow side plugging portions is less than 10% of the overall length L0 of the honeycomb structure.

2. The honeycomb filter according to claim 1, wherein the number of the first outflow side plugging portions is 10 to 50% of a total number of the outflow side plugging portions.

3. The honeycomb filter according to claim 1, wherein the honeycomb structure has a length L0 of 100 to 350 mm.

4. The honeycomb filter according to claim 1, wherein let that, on the outflow end face side of the honeycomb structure, a direction of arranging the plurality of cells in one direction is a first direction and a direction orthogonal to the first direction is a second direction, adjacent cells along the first direction and adjacent cells along the second direction are each plugged alternately with one of the inflow side plugging portions and one of the outflow side plugging portions, and of the outflow side plugging portions along the first direction or the second direction, the first outflow side plugging portions and the second outflow side plugging portions are placed so as to be adjacent in any one of the first direction and the second direction.

5. The honeycomb filter according to claim 1, wherein let that, on the outflow end face side of the honeycomb structure, a direction of arranging the plurality of cells in one direction is a first direction and a direction orthogonal to the first direction is a second direction, adjacent cells along the first direction and adjacent cells along the second direction are each plugged alternately with one of the inflow side plugging portions and one of the outflow side plugging portions, and of the outflow side plugging portions along the first direction or the second direction, the number of the first outflow side plugging portions placed continuously is 4 or less.

6. The honeycomb filter according to claim 1, wherein the partition wall has porosity of 30 to 70%.

7. The honeycomb filter according to claim 1, wherein let that a length of the inflow side plugging portions from the inflow end face is a plugging length L3, the plugging length L3 of the inflow side plugging portions is less than 10% of the overall length L0 of the honeycomb structure.

8. The honeycomb filter according to claim 2, wherein the honeycomb structure has a length L0 of 100 to 350 mm.

* * * * *